(12) United States Patent
Yoshitani et al.

(10) Patent No.: US 7,933,049 B2
(45) Date of Patent: Apr. 26, 2011

(54) MULTIFUNCTION PRINTER AND IMAGE PROCESSING METHOD

(75) Inventors: Akihiro Yoshitani, Yokohama (JP); Hisashi Ishikawa, Urayasu (JP); Norikazu Honda, Yokohama (JP); Hirowo Inoue, Kawasaki (JP); Michiaki Takasaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 11/773,804

(22) Filed: Jul. 5, 2007

(65) Prior Publication Data

US 2008/0007795 A1    Jan. 10, 2008

(30) Foreign Application Priority Data

Jul. 7, 2006    (JP) .................................. 2006-188697
Jun. 26, 2007    (JP) .................................. 2007-168087

(51) Int. Cl.
*H04N 1/00*    (2006.01)

(52) U.S. Cl. .................. 358/426.02; 358/1.9; 358/1.15; 358/426.01; 358/426.07; 358/461; 358/474; 358/519; 382/162; 382/166; 382/167; 382/232; 382/233; 382/234

(58) Field of Classification Search .................. 358/1.9, 358/1.15, 426.01, 426.02, 426.07, 461, 474, 358/519; 382/162, 166, 167, 232, 233, 234
See application file for complete search history.

(56) References Cited

U.S. PATENT DOCUMENTS

| | | | | |
|---|---|---|---|---|
| 4,982,283 A | * | 1/1991 | Acampora | 375/240.12 |
| 5,249,047 A | * | 9/1993 | Aoki et al. | 375/240.12 |
| 5,768,445 A | * | 6/1998 | Troeller et al. | 382/305 |
| 2003/0137695 A1 | | 7/2003 | Nomizu | 358/1.16 |
| 2004/0130553 A1 | | 7/2004 | Ushida et al. | 345/531 |
| 2005/0259876 A1 | * | 11/2005 | Ogawa | 382/232 |
| 2007/0002411 A1 | * | 1/2007 | Sakai et al. | 358/540 |

FOREIGN PATENT DOCUMENTS

| | | |
|---|---|---|
| EP | 1 119 179 | 7/2001 |
| EP | 1119179 A2 * | 7/2001 |
| JP | 7-170372 | 7/1995 |
| JP | 2004-220584 | 8/2004 |
| JP | 2005-262676 | 9/2005 |

OTHER PUBLICATIONS

Korean Office Action dated Nov. 10, 2008 in corresponding Korean Application No. 10-2007-0068023.
European Search Report dated Nov. 6, 2008 in corresponding European Application No. 07111999.4.

* cited by examiner

*Primary Examiner* — Mark K Zimmerman
*Assistant Examiner* — Miya J Cato
(74) *Attorney, Agent, or Firm* — Fitzpatrick, Cella, Harper & Scinto

(57) ABSTRACT

This invention relates to an MFP having copy and scanner functions. The MFP in which image data flows from a line sensor to a DRAM via an A/D conversion unit and a reading control unit (RCU) and then from an image processing unit (IPU) to a printer via the DRAM has the following arrangement. Both the RCU and the IPU can execute a shading process. In the CM, the RCU executes the shading process. Then, the image is compressed and stored in the DRAM. In the SM, the RCU does not execute the shading process, and the image is temporarily stored in the DRAM without compression. The IPU reads out image data of each rectangle from the DRAM together with shading data, executes the shading process and various kinds of image processing, and outputs the image data to the DRAM.

9 Claims, 9 Drawing Sheets

MULTIFUNCTION PRINTER AND IMAGE PROCESSING METHOD

BACKGROUND OF THE INVENTION

1. Field of the Invention

The present invention relates to a multifunction printer having a copy function and a scan function capable of transferring read image data to a connected host apparatus, and an image processing method.

2. Description of the Related Art

FIG. 5 is a block diagram showing the arrangement of a conventional multifunction printer (to be referred to as an MFP hereinafter) having a copy function and a scan function.

Referring to FIG. 5, a control chip 10 controls the entire apparatus. Each of blocks 100 to 1200 to be described below is integrated in a single chip. A scanner I/F 100 receives, from the outside of the control chip 10, image data of each line A/D-converted by an AFE 2400 and writes the image data in a main memory 2000 by using a DMAC 110.

A scanner image processing unit 200 reads out image data from the main memory 2000 by using a DMAC 210, executes predetermined image processing such as edge enhancement and γ-conversion, and writes the process result in the main memory 2000 again by using the DMAC 210.

A printer image processing unit 300 is a block that converts image data processed by the scanner image processing unit 200 into a CMYK (density) data for printer output. The printer image processing unit 300 writes and reads to/from the main memory 2000 by using a DMAC 310.

A printer I/F 400 is an interface circuit that transmits CMYK data, that is the process result of the printer image processing unit 300, to a printer 2100. The printer I/F 400 reads from the main memory 2000 by using a DMAC 410.

The scanner I/F 100, scanner image processing unit 200, printer image processing unit 300, and printer I/F 400 connect to a common image bus 1100 via the DMACs 110, 210, 310, and 410, respectively.

A memory control unit 500 executes arbitration and interface control between the main memory 2000, and the image bus 1100 or a control bus 1200.

A CPU 600 controls the entire apparatus.

A motor controller 700 controls the motor of the scanner or printer.

A panel I/F 800 executes interface control to an operation unit 2500.

An SIO 900 executes interface control to a ROM 2600.

A USB device I/F 1000 executes a communication process with a host apparatus (PC) connected to the MFP.

The CPU 600, motor controller 700, panel I/F 800, SIO 900, and USB device I/F 1000 connect to the common control bus 1200.

The main memory 2000 is used by the CPU 600 or each process block as a work memory. The printer 2100 outputs image data to a printing medium such as a printing paper sheet. An image reading processing unit 2300 uses an optical device such as a CCD or CIS. The AFE 2400 A/D-converts image data that is line-sequentially output from the image reading processing unit 2300 as analog data and outputs the converted image data to the scanner I/F 100 of the control chip 10 as image data of each line.

The operation unit 2500 includes an LCD to output various kinds of information to the user of the MFP and keys to be directly operated by the user, and inputs/outputs information to/from the control chip 10 via the panel I/F 800. The ROM 2600 stores the operation program of the CPU 600.

FIG. 6 is a block diagram showing the detailed arrangement in the scanner image processing unit 200.

Referring to FIG. 6, a shading processing unit 201 corrects the sensitivity fluctuation between the pixels of the CCD and CIS. A γ-conversion processing unit 202 converts the gradation characteristic of image data that has undergone the shading process. A character determination processing unit 203 checks the pixel values of n×n pixels with a given central pixel and determines whether or not they are part of a character image. A filter processing unit 204 executes edge enhancement and moire suppression by filter calculation based on the pixel values of m×m pixels with a given central pixel.

The shading processing unit 201, character determination processing unit 203, and filter processing unit 204 have a dedicated shading (SHD) buffer 201a, and dedicated line buffers 203a and 204a to store shading data or image data of a plurality of lines, respectively. Image data or shading data stored in the main memory 2000 is read out in the main scanning direction (the moving direction of the CCD or CIS) in correspondence with a plurality of lines, stored in the line buffers, and individually processed.

For example, Japanese Patent Publication Laid-Open No. 7-170372 discloses a prior art apparatus with the above-described conventional arrangement.

The arrangement disclosed in Japanese Patent Publication Laid-Open No. 7-170372 requires a very large capacity line memory because each image processing block in the image processing unit must have a line memory necessary for the image processing. For example, a line memory corresponding to four lines of an original width is necessary for a 5×5 pixel filter process. If an input image is an A4 color image having a resolution of 600 dpi (=5000 pixel/line) and 16 bits per pixel, the control chip 10 must incorporate a large capacity memory of 120 kB. Additionally, the memory size needs to be proportional to the resolution of input image data and the actual original size in the widthwise direction.

To solve this problem, Japanese Patent Publication Laid-Open No. 2004-220584 proposes a new image processing system.

According to Japanese Patent Publication Laid-Open No. 2004-220584, image data output from the reading control unit and line-sequentially stored in the main memory is read out in correspondence with each rectangle including a "margin" necessary for image processing, as shown in FIG. 7. In addition, light/dark shading data at the position corresponding to the rectangle is read out from the main memory simultaneously. The image processing unit executes various kinds of image processing such as a shading process and writes the process result in the main memory in correspondence with each rectangle again.

This process allows each image processing unit to have a line memory corresponding to not the original width but only the width of the rectangle. It is therefore possible to greatly reduce the total size of the line memories of the image processing units. If input image data has a higher resolution, or the input image size itself increases from, e.g., A4 to A3, it is necessary to merely increase the number of times of rectangle readout from the main memory. Hence, it is easy to cope with even an increase in the resolution or size of an image. The "margin" here indicates an area that must be read out from the main memory as an additional area outside the input rectangle to execute image processing for the whole input rectangle. For example, to perform a 5×5 pixel filter process, two extra lines must be read out on each of the upper, lower, left, and right sides of an input rectangle.

However, the method disclosed in Japanese Patent Publication Laid-Open No. 2004-220584 still has a problem.

In this method, the image processing unit cannot start the process before the scanner I/F outputs image data corresponding to the longitudinal size of the rectangle to the main memory. Hence, the main memory must have a capacity to store at least the longitudinal size of the rectangle of image data of one line.

This problem is solved by simply reducing the longitudinal size of the rectangle, as a matter of course. In this case, however, the "margin" added to the rectangle read out from the main memory and shading data necessary for the shading process of the rectangle suffer a great influence. When the longitudinal size of the rectangle corresponds to n lines, the 5×5 pixel filter process requires a margin corresponding to a total of four lines on the upper and lower sides and shading data corresponding to two lines (light/dark). It is therefore necessary to read out data corresponding to (n+6) lines from the main memory. This means that, as n becomes smaller, the necessary data amount to be read out from the main memory increases relatively. This requires a wide data access band between the control chip 10 and the main memory 2000.

The memory necessary for using the scanner function of the MFP has been described above. An MFP having a copy function requires a memory for both the scanner and print functions. FIG. 8 shows the data flow in the MFP in this case.

In the copy mode, image data read by the image reading processing unit 2300 and A/D-converted by the AFE 2400 is temporarily written in buffer 1 in the main memory 2000 line-sequentially. The scanner image processing unit 200 reads out the image data from buffer 1 together with shading data corresponding to a rectangle including a margin, executes various kinds of image processing, and writes the processed image data in buffer 2 in the main memory. The printer image processing unit 300 line-sequentially reads out the image data from buffer 2, converts the image data into CMYK binary data processible by the printer 2100, and writes the data in buffer 3 in the main memory 2000. The printer I/F 400 reads out the CMYK binary data written in buffer 3, outputs the data to the printer 2100, and prints it on an output paper sheet.

In the scan mode, the data flow up to the scanner image processing unit 200 is the same as described above. The data output from the scanner image processing unit 200 is stored not in buffer 2 but in the transmission buffer to the USB device I/F 1000 and transmitted to the PC via the USB. Buffers 2 and 3 are unnecessary. Since the size of the transmission buffer is smaller than that of buffer 2 or 3, the required total size of the buffer memory is smaller than in the copy mode.

As described above, in the copy mode, all of the scanner I/F, scanner image processing unit, printer image processing unit, and printer I/F in the MFP access the main memory. To do this, the main memory must incorporate buffers 1 to 3 to buffer the process speed difference between the process blocks. Additionally, a very wide data access band is necessary between the control chip and the main memory.

As summarized, the method proposed in Japanese Patent Publication Laid-Open No. 2004-220584 has the following problems.

(1) The buffer memory (buffer 1 in FIG. 8) between the scanner I/F and the scanner image processing unit must have a relatively large capacity.

(2) In the copy mode, the main memory requires a buffer memory (buffer 1+buffer 2+buffer 3 in FIG. 8) with a large capacity, and a wide data access band is necessary between the control chip and the main memory.

SUMMARY OF THE INVENTION

Accordingly, the present invention is conceived as a response to the above-described disadvantages of the conventional art.

For example, a multifunction printer having a copy function and a scanner function and an image processing method according to this invention are capable of implementing both a high memory utilization in a copy mode and a high image quality in a scan mode.

According to one aspect of the present invention, preferably, there is provided a multifunction printer having a first function of copying an image original and a second function of outputting image data obtained by scanning the image original to an external device (PC), comprising: reading means for line-sequentially reading the image original by scan; a memory which stores image data read by the reading means; first image processing means for executing the first function; and second image processing means for executing the second function, wherein the first image processing means includes: compression means for compressing the image data read by the reading means; and first output means for outputting the compressed image data compressed by the compression means to the memory.

According to another aspect of the present invention, preferably, there is provided an image processing method executed by a multifunction printer having a first function of copying an image original and a second function of outputting image data obtained by scanning the image original to an external device (PC), comprising the steps of: line-sequentially reading the image original by scan; compressing the image data read in the reading step upon executing the first function; and outputting the compressed image data compressed in the compressing step to a memory.

The invention is particularly advantageous since the total memory size required of the multifunction printer to implement necessary functions can be reduced. Additionally, since compression upon storing read image data in the memory is executed only when executing the copy function, image quality degradation when executing the scan function can be prevented.

Further features of the present invention will become apparent from the following description of exemplary embodiments (with reference to the attached drawings).

DESCRIPTION OF THE EMBODIMENTS

Preferred embodiments of the present invention will now be described in detail in accordance with the accompanying drawings.

In this specification, the terms "print" and "printing" include not only the formation of significant information such as characters and graphics, but also the formation of images, figures, patterns, and the like on a print medium, or the processing of the medium, regardless of whether they are significant or insignificant and whether they are so visualized as to be visually perceivable by humans.

Also, the term "print medium" includes not only a paper sheet used in common printing apparatuses, but also materials, such as cloth, a plastic film, a metal plate, glass, ceramics, wood, and leather, capable of accepting ink.

Figure 1:
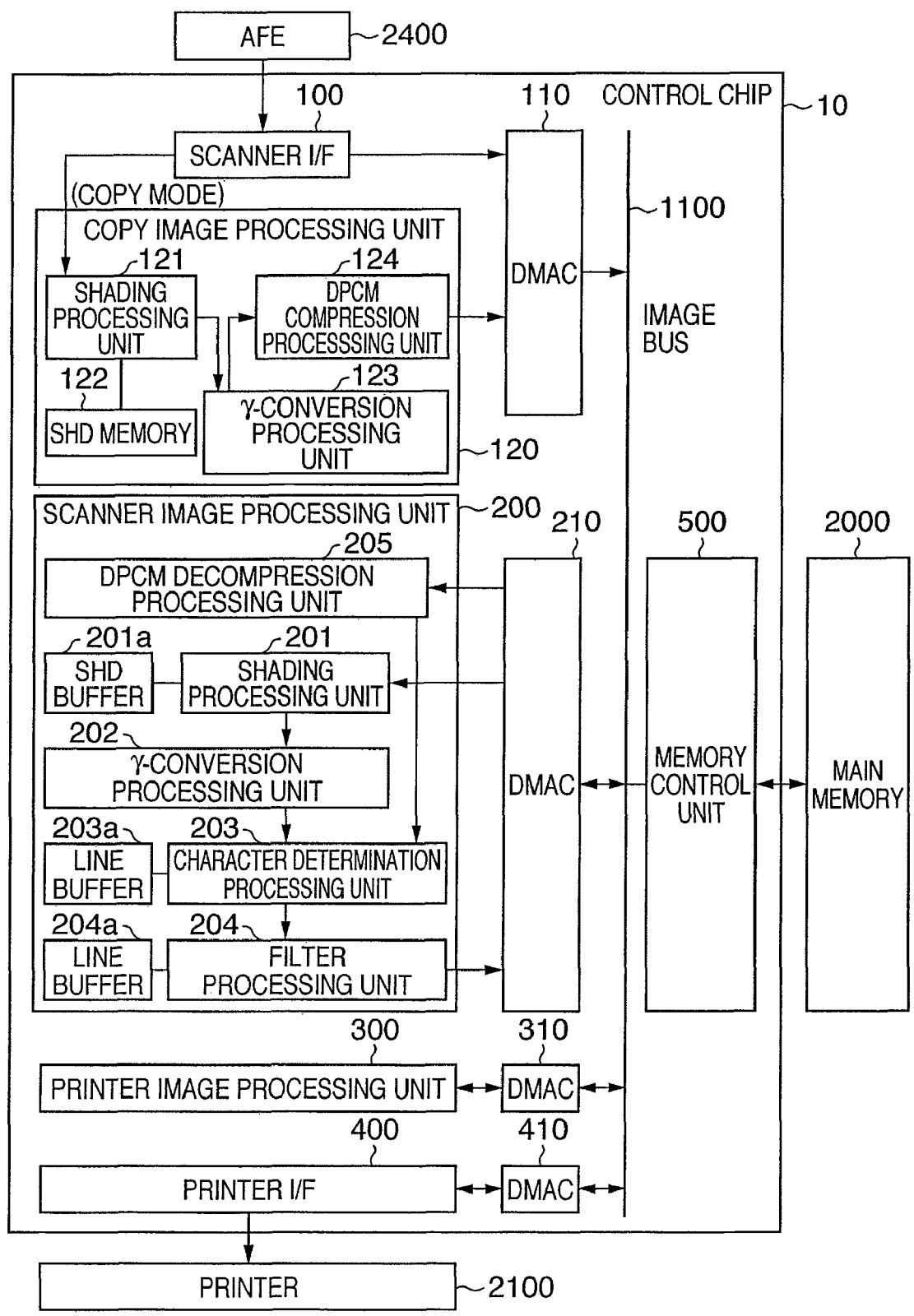
FIG. 1 is a block diagram showing the schematic arrangement of a multifunction printer as a typical embodiment of the present invention.

FIG. 1 is a block diagram showing the schematic arrangement of a multifunction printer (MFP) as a typical embodiment of the present invention. The same reference numerals as in the prior art denote the same constituent elements, and a description thereof will not be repeated. The difference in characteristic features between the MFP of the prior art and that of the embodiment will be described here on the basis of comparison with the arrangement shown in FIG. 5.

Figure 5:
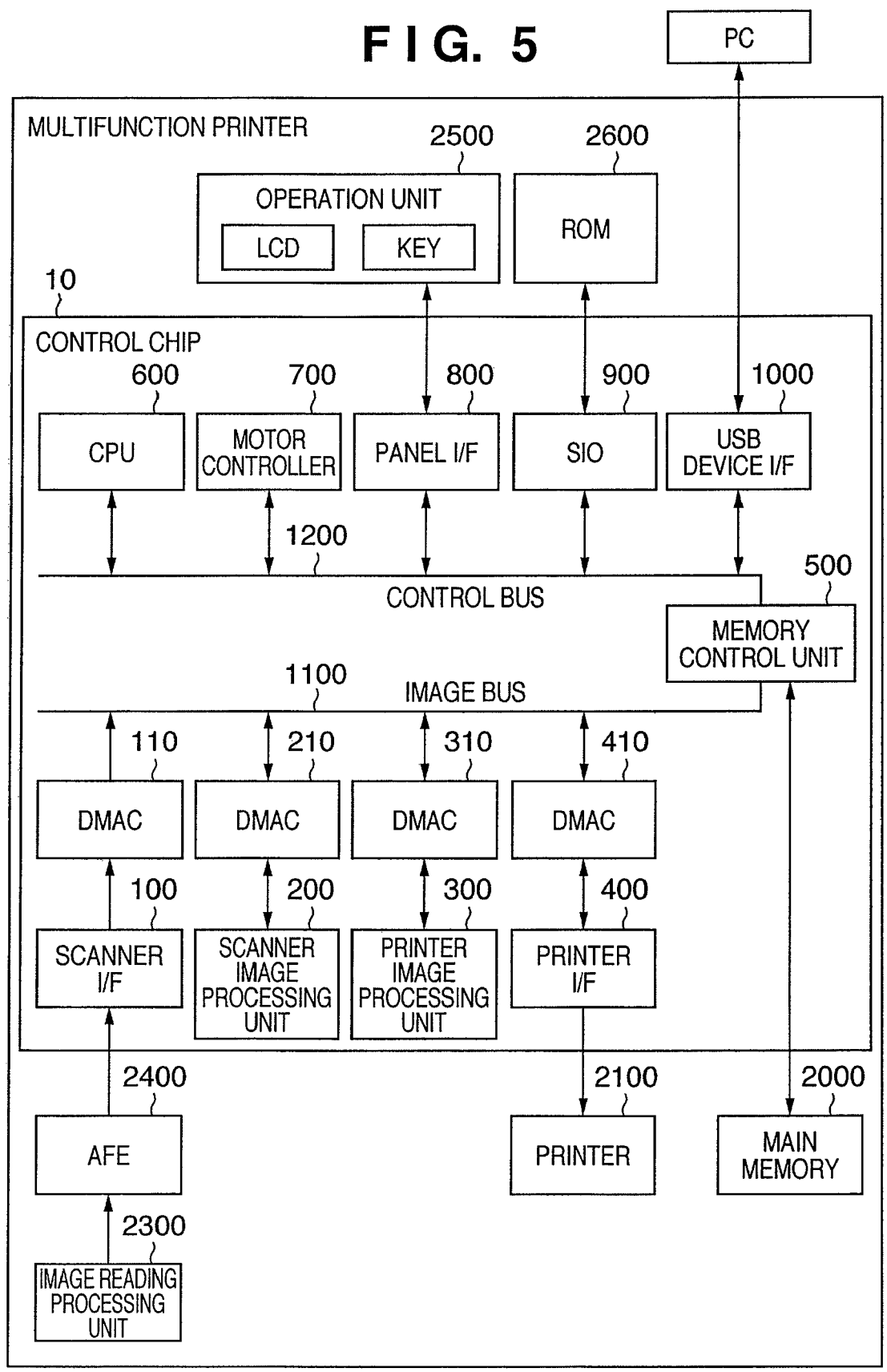
FIG. 5 is a block diagram showing the schematic arrangement of a conventional multifunction printer.
Figure 6:
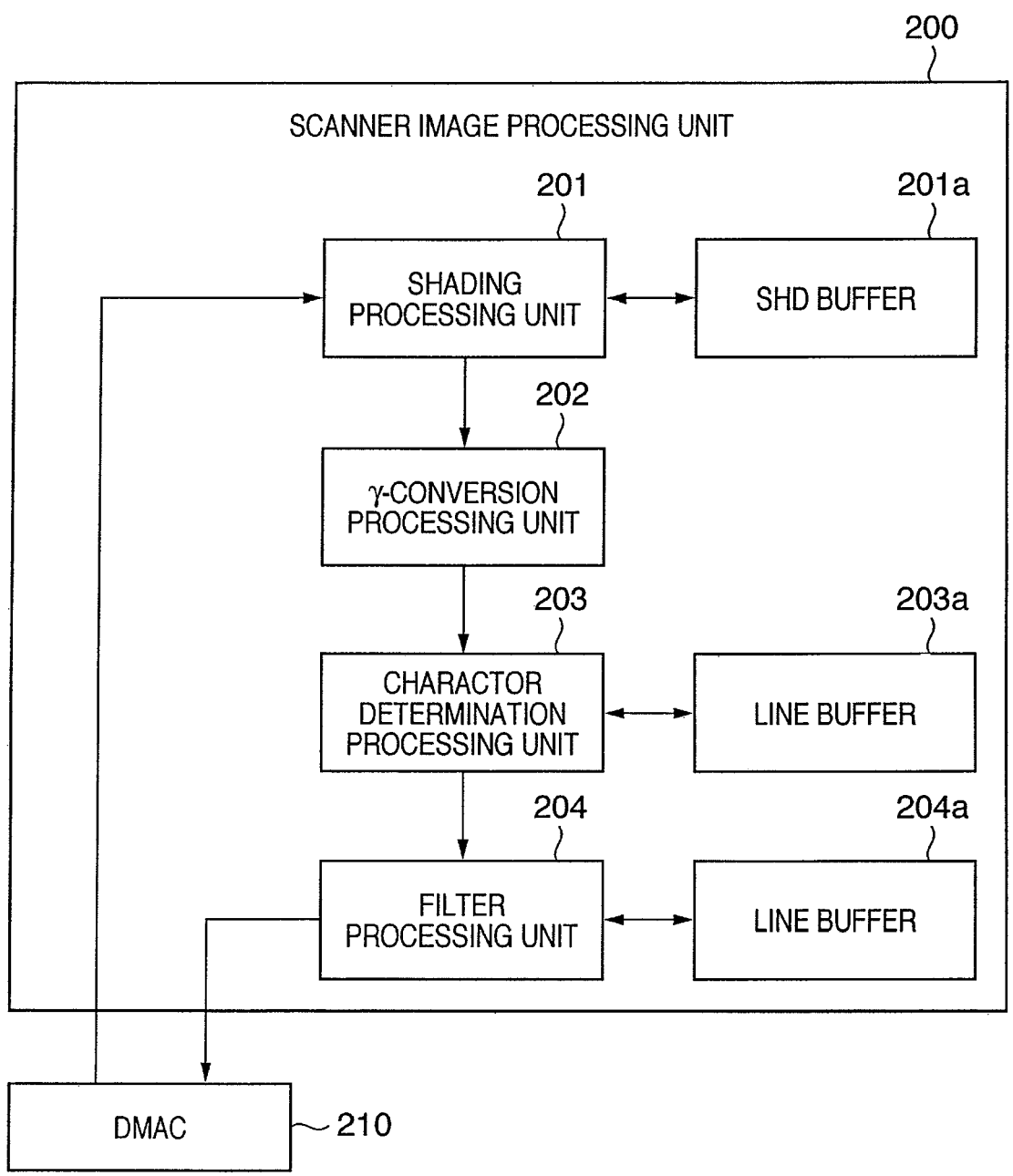
FIG. 6 is a block diagram showing the internal arrangement of a scanner image processing unit of the multifunction printer shown in FIG. 5.

As is apparent from comparison between FIGS. 1 and 5, this embodiment adds a copy image processing unit 120 to the output of the scanner I/F, as shown in FIG. 1. The copy image processing unit 120 incorporates a shading memory (SRAM) 122 to store shading data of a necessary amount in a copy mode, a shading processing unit 121, a γ-conversion processing unit 123, and a DPCM compression processing unit 124. A shading processing unit 201 remains in a scanner image processing unit 200 as in the prior art. A DPCM decompression processing unit 205 is added to the scanner image processing unit 200.

The remaining components are the same as in the prior art shown in FIG. 5. The blocks connected to the control bus side are not illustrated in FIG. 1.

Processing operations executed by the MFP having the arrangement shown in FIG. 1 in copy and scan modes will be described below in detail.

<Process in Scan Mode>

The process in the scan mode will be described first. The contents of this process are fundamentally the same as those disclosed in Japanese Patent Publication Laid-Open No. 2004-220584 and will be described below.

1. Light/dark shading data of each color component is acquired in advance and held in a main memory 2000.

2. An original reading process starts. Digital image data is line-sequentially input from an AFE 2400 to a control chip 10 via a scanner I/F 100.

3. Uncompressed data is line-sequentially written in the main memory 2000 by a DMAC 110 without using the copy image processing unit 120.

Figure 7:
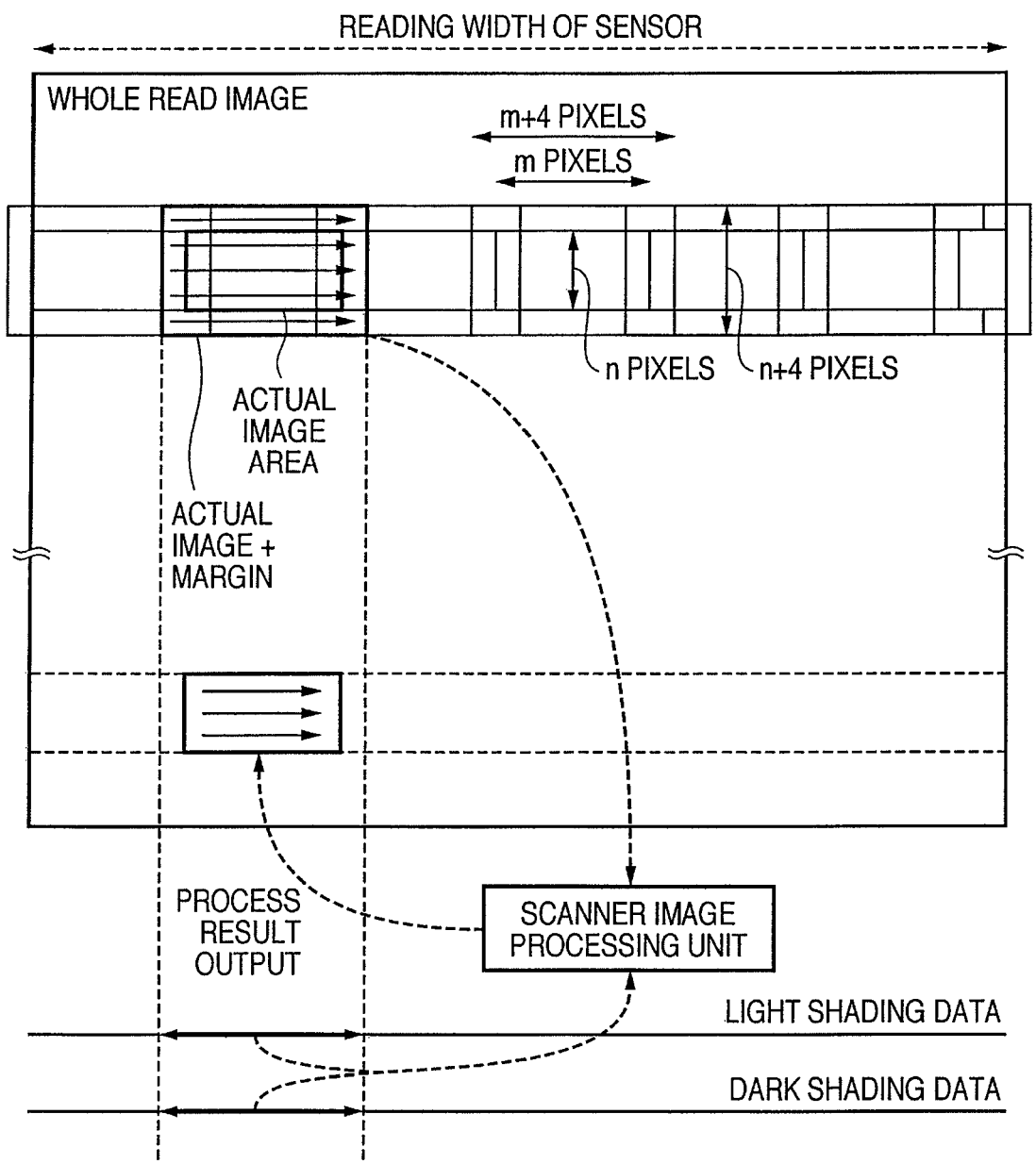
FIG. 7 is a view showing image data readout from a main memory and output to the main memory after image processing which are executed by a scanner image processing unit, according to Japanese Patent Publication Laid-Open No. 2004-220584.
Figure 8:
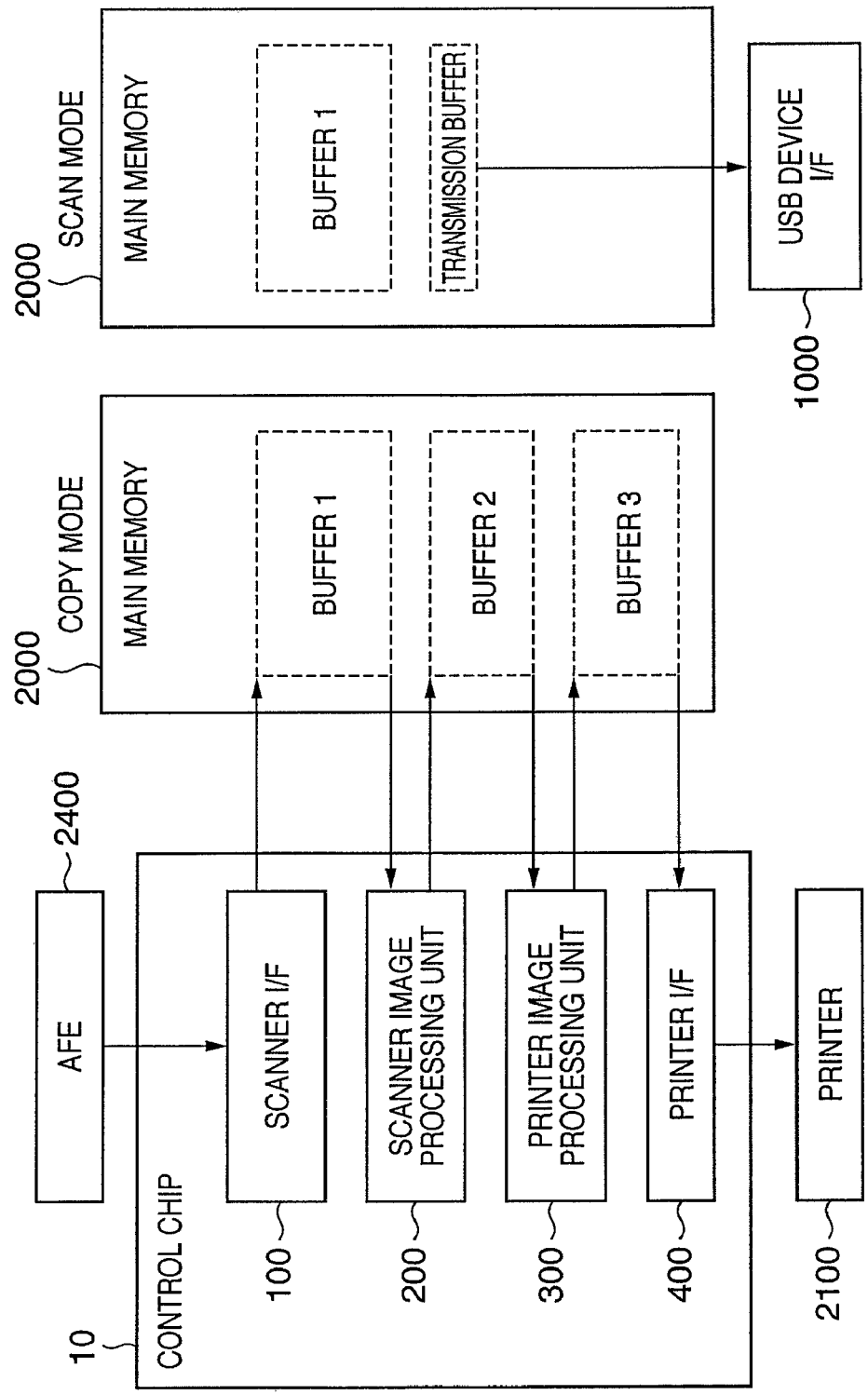
FIG. 8 is a view showing the relationship between image processing units and the buffers in the main memory of the conventional multifunction printer.

4. The scanner image processing unit 200 starts the process when the line-sequential image data output to the main memory 2000 exceeds the height (including the margin) of a rectangle to be processed by the scanner image processing unit 200. When the output rectangle size of the scanner image processing unit 200 is m×n, a margin corresponding to two pixels on each of the upper, lower, left, and right sides is necessary for a 5×5 pixel filter process. Hence, the input image is a rectangle with a size of (m+4)×(n+4) pixels. A DMAC 210 reads out rectangular image data corresponding to this part and shading data of (m+4)×two lines (light/dark) corresponding to this part simultaneously, as shown in FIG. 7.

5. The blocks in the scanner image processing unit 200 execute the shading process, input γ-conversion process, and filter process. The DMAC 210 outputs the rectangular image data with m×n pixels as a process result except the margin portion.

6. The processes 4 and 5 are repeated until image data corresponding to one stripe (the sum of output rectangles in the main scanning direction) is output. A CPU 600 line-sequentially transmits the processed image data of one stripe output to the main memory 2000 to a connected PC via a USB device I/F 1000.

7. When the output image data from an image reading processing unit 2300 reaches the height (the (2n+4)th line counted from the beginning) of the next rectangle to be processed by the scanner image processing unit 200, the scanner image processing unit 200 starts the process of the next stripe. In the same way, the process is repeated every time data corresponding to n lines is output from the image reading processing unit 2300 and stored.

<Process in Copy Mode>

The process in the copy mode will be described next.

A process of line-sequentially inputting image data from the AFE 2400 and outputting it to the main memory 2000 will be described first.

1. Shading data with a copy resolution is acquired in advance, and is written in the shading (SHD) memory (SRAM) 122.

2. An original reading process starts. Line-sequential digital image data is input from the AFE 2400 to the control chip 10 via the scanner I/F 100.

3. The line-sequential digital image data output from the scanner I/F 100 is input to the copy image processing unit 120. The shading processing unit 121 in the copy image processing unit 120 executes the shading process. Shading data is read out from the shading memory 122, as needed, in synchronism with the input image data. Since this process corrects the sensitivity fluctuation between the pixels of the sensor, image quality degradation caused by subsequent DPCM compression process can be minimized.

4. The γ-conversion processing unit 123 executes the input γ-conversion process. This process reduces the number of gradations of the input image. Thus, image quality degradation caused by the subsequent DPCM compression process can be suppressed further.

5. The DPCM compression process is executed for each line of the input image. The algorithm of DPCM compression will be described later.

6. The compressed image data of each line is written in the main memory 2000 by using the DMAC 110.

With the DPCM compression process, the image data containing 16 bits per pixel, which is obtained as a result of the shading process and input γ-conversion process, is compressed to fixed length image data containing 8 bits per pixel.

Figure 2:
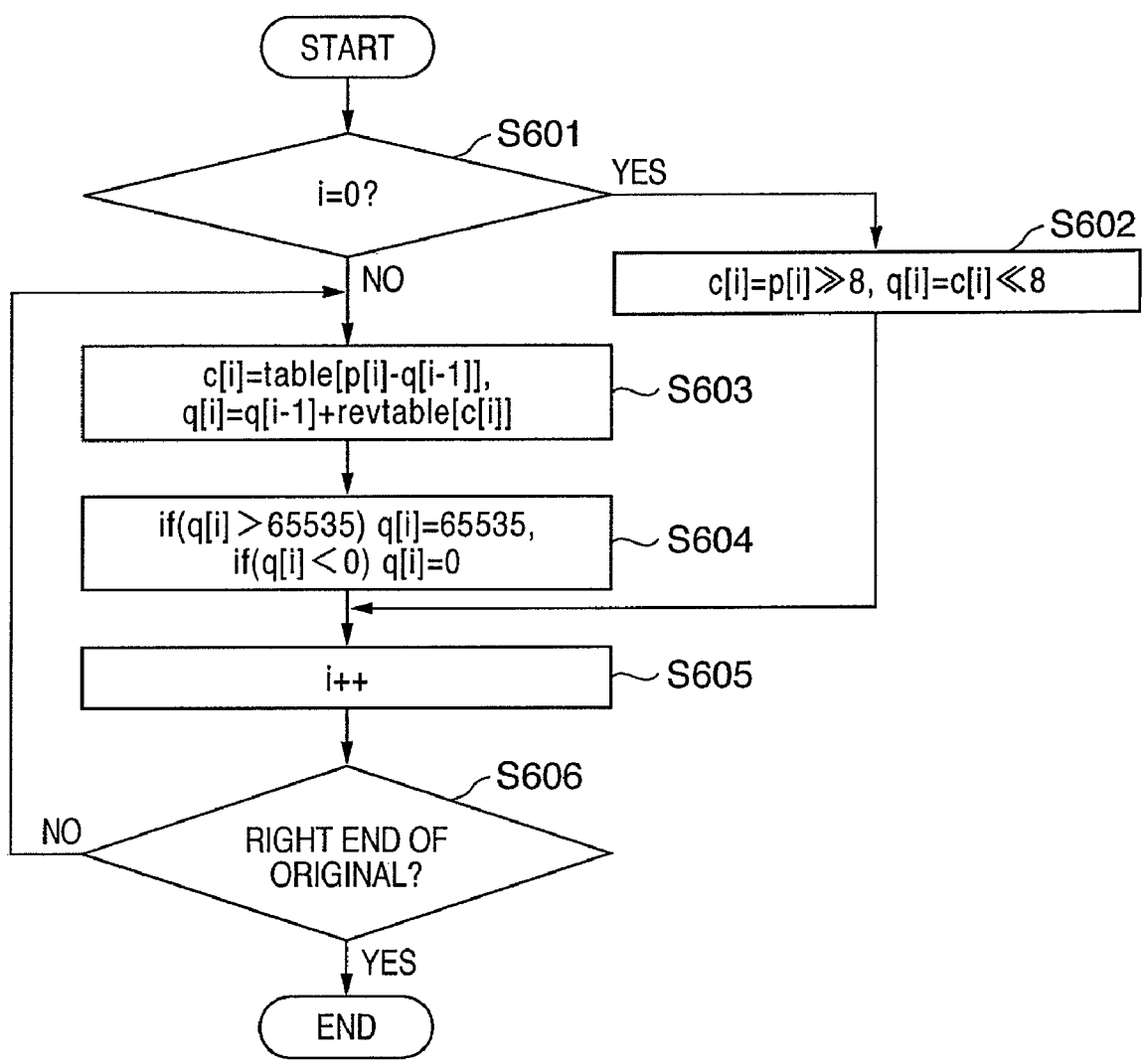
FIG. 2 is a flowchart illustrating an input image data DPCM (differential pulse code modulation) compression process executed in an image copy mode.

FIG. 2 is a flowchart illustrating the outline of the DPCM compression process.

Let $p[i]$ (16 bits) be the i-th pixel value from the left end in one line of an input 16-bit digital image, $c[i]$ (8 bits) be coded data corresponding to the pixel, and $q[i]$ (16 bits) be decoded data.

In addition, $$table[j]=(int)(j/512)+128$$

$$(-65536<j<65536)$$

$$revtable[k]=(k-128)*512$$

($0 \leq k < 256$)

In step S601, the value i is checked. If i=0, the process advances to step S602. If i≠0, the process advances to step S603.

In step S602, c[i]=p[i]>>8 and q[i]=c[i]<<8 are calculated. Then, the process advances to step S605. Note that ">>8" indicates an operation of shifting the input bit string to the right by 8 bits while "<<8" indicates an operation of shifting the input bit string to the left by 8 bits. With this operation, all the lower 8 bits of the image data with 16 bits per pixel are set to "0".

In step S603, c[i]=table[p[i]−q[i−1]] and q[i]=q[[i−1]+revtable[c[i]] are calculated. Then, the process advances to step S604.

In step S604, if q[i]>65535, q[i]=65535. If q[i]<0, q[i]=0. Then, the process advances to step S605.

In step S605, the value i is incremented by "+1". Then, the process advances to step S606.

In step S606, it is checked whether or not the pixel of interest exists at the right end of the image. If "YES" in step S606, the process ends. Otherwise, the process returns to step S603.

By executing the DPCM compression process for each line of the input image data, the output from the image reading processing unit is fixed length-compressed from 16 bits to 8 bits per pixel.

How the scanner image processing unit 200 processes the compressed image data written in the main memory 2000 will be described next with reference to a flowchart.

Figure 3:
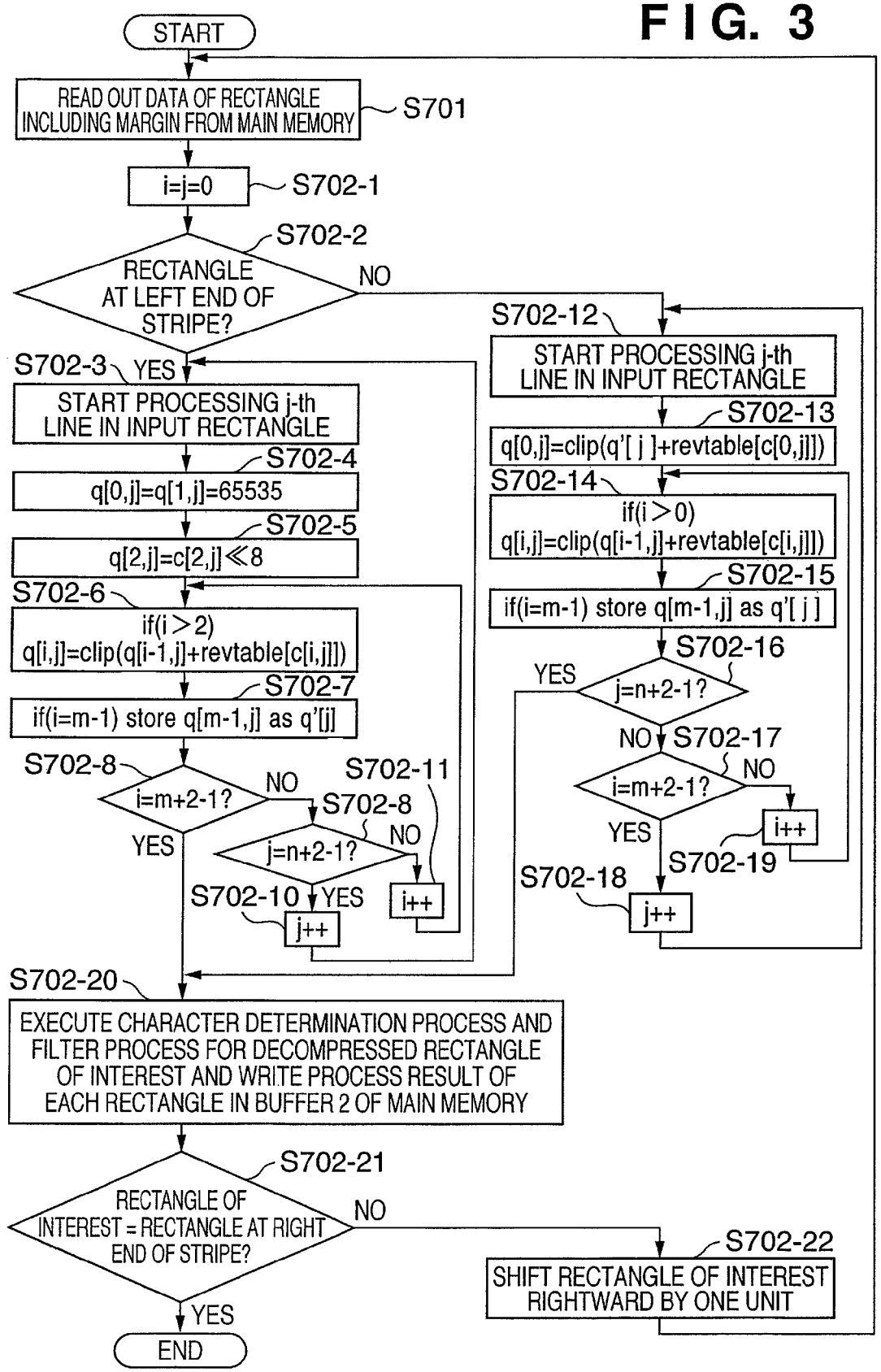
FIG. 3 is a flowchart illustrating data readout from each memory and a DPCM decompression process executed in an image copy mode.

FIG. 3 is a flowchart illustrating the compressed image data decompression process by the scanner image processing unit 200.

In step S701, the DMAC 210 of the scanner image processing unit 200 reads out, from the main memory 2000, image data including an output rectangle with m×n pixels and a margin corresponding to two pixels on each of the upper, lower, left, and right sides, as shown in FIG. 7, as in the scan mode. Note that the data amount and address difference value are ½ in reading out a rectangle at the same position as in the scan mode because the image data is fixed length-compressed from 16 bits to 8 bits per pixel. It is unnecessary to read out shading data.

In step S702, the DPCM decompression processing unit 205 in the scanner image processing unit 200 executes a DPCM decompression of the image data read out via the DMAC 210 on the basis of the following algorithm. The decompression process needs to be performed for each line of the rectangle.

In the following explanation, when the output rectangle contains m×n pixels, the input rectangle contains (m+2)×(n+2) pixels. Let c[i,j] be coded data (8 bits per pixel) at coordinate values (i,j), and q[i,j] be the decompression result (16 bits per pixel).

In step S702-1, i=j=0.

In step S702-2, it is checked whether or not the input rectangular image (stripe) is at the left end of the input image. If "YES" in step S702-2, the process advances to step S702-3. Otherwise, the process advances to step S702-11.

In step S702-3, the decompression process of the j-th line of the input rectangle starts.

In step S702-4, two pixels at the left end of the input rectangle correspond to the margin. Coded data representing the actual image starts from the next input pixel. For this reason, "65535" is always output for two pixels at the left end as white pixels. That is, q[0,j]=q[1,j]=65535.

In step S702-5, since the third pixel (=left end pixel of original) has been compressed by neglecting the lower 8 bits, the input 8-bit data is multiplied by 256 and output as 16-bit data. That is, q[2,j]=c[2,j]<<8.

In step S702-6, the fourth and subsequent pixels are decoded by the following process.

That is, q[i,j]=q[i−1,j]+revtable[c[i,j]] is calculated. If q[i,j]>65535, q[i,j]=65535. If q[i,j]<0, q[i,j]=0.

In step S702-7, for each line (j=0 to n+2−1) of the rectangle, the DPCM decompression processing unit 205 internally stores, as q'[j], the decompression output value q[m−1,j] of the m-th pixel from the left end of the input rectangle.

In step S207-8, when all pixels of the input rectangle are decompressed (j=n+2−1), the process advances to step S702-20.

In step S702-9, when the decompression process has reached the right end of the input rectangle (i=m+2−1), the process advances to step S702-10. Otherwise, the process advances to step S702-11.

In step S702-10, the value j is incremented by "+1". Then, the process returns to step S702-3.

In step S702-11, the value i is incremented by "+1". Then, the process returns to step S702-6.

In step S702-12, the decompression process of the j-th line of the input rectangle starts.

In step S702-13, if i=0, the following process is performed by using the decompression output value q'[j] stored in the process in step S702-7 or S702-15.

That is, q[0,j]=q'[j]+revtable[c[0,j]] is calculated. If q[0,j]>65535, q[0,j]=65535. If q[0,j]<0, q[0,j]=0.

In step S702-14, the following process is executed.

When i≠0, q[i,j]=q[i−1,j]+revtable [c[i,j]] is calculated. If q[i,j]>65535, q[i,j]=65535. If q[i,j]<0, q[i,j]=0.

In step S702-15, for each line (j=0 to n+2−1) of the rectangle, the DPCM decompression processing unit 205 internally stores, as q'[j], the decompression output value q[m−1,j] of the m-th pixel from the left end of the input rectangle.

In step S702-16, it is checked whether or not all pixels of the input rectangle are decompressed. If j=n+2−1, the process advances to step S702-20. If j≠n+2−1, the process advances to step S702-17.

In step S702-17, it is checked whether or not the decompression process has reached the right end of the input rectangle. If i=m+2−1, the process advances to step S702-18. If i≠m+2−1, the process advances to step S702-19.

In step S702-18, the value j is incremented by "+1". Then, the process returns to step S702-12.

In step S702-19, the value i is incremented by "+1". Then, the process returns to step S702-14.

In step S702-20, since the decompression process of the rectangle of interest finishes in step S702-8 or S702-16, a character determination process and a filter process are executed for the decompressed rectangular image data. The shading process and γ-conversion process are not executed here because they have already been performed in the copy image processing unit. The filter processing unit removes the margin corresponding to two pixels on each of the upper, lower, left, and right sides of an input rectangle. The result is written in buffer 2 in the main memory 2000 for each rectangle by using the DMAC 210.

In step S702-21, it is checked whether or not the current rectangle of interest is at the right end of the stripe. If "YES" in step S702-21, the process of the stripe ends. Otherwise, the process advances to step S702-22.

In step S702-22, the rectangle of interest is shifted rightward by one unit, and the process returns to step S701.

In the above-described manner, the scanner image processing unit 200 executes the process of one stripe of the input image. The process is repeated for each stripe.

The processes will be summarized as follows. In the copy mode, the shading process and γ-conversion process are executed for digital image data line-sequentially input from the AFE 2400 by using shading data stored in the shading memory 122 in the copy image processing unit 120. Then, the DPCM compression process is executed, and the compressed data is line-sequentially written in the main memory. The scanner image processing unit 200 decompresses the compressed data read out from the main memory in correspondence with each rectangle and executes various kinds of image processing such as the filter process other than the shading and γ-conversion processes.

In the scan mode, digital image data line-sequentially input from the AFE 2400 is not subjected to the process by the copy image processing unit 120 and is line-sequentially written in the main memory without compression. The scanner image processing unit reads out the image data of each rectangle and simultaneously reads out shading data corresponding to the position of the rectangle from the main memory. The scanner image processing unit 200 executes the shading process and input γ-conversion process, and then executes various kinds of image processing such as the filter process.

Figure 4:
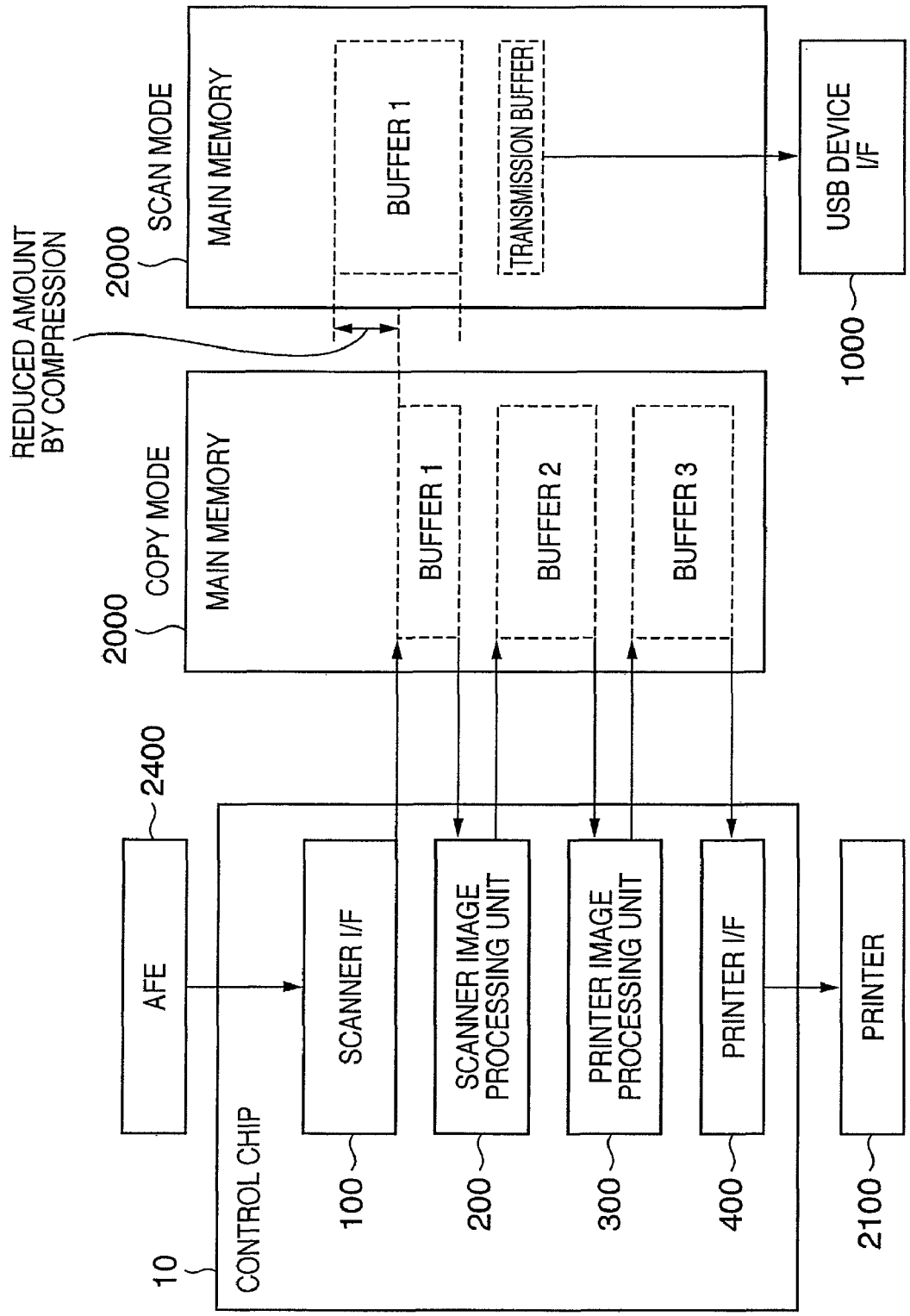
FIG. 4 is a view showing a buffer memory capacity necessary when copy and scan are executed.

FIG. 4 is a view showing a buffer memory necessary when copy and scan are executed in accordance with the embodiment. As shown in FIG. 4, according to this embodiment, the capacity of buffer 1 necessary in the copy mode decreases to ½ that of the prior art because of image data compression. That is, the decrease amount by compression corresponds to the difference in size between buffer 1 in the copy mode and that in the scan mode.

The total size of the buffer memory necessary in the scan mode remains unchanged. The scan mode requires a smaller buffer memory size inherently as compared to the copy mode.

That is, in this embodiment, the copy image processing unit 120 is added between the scanner I/F 100 and the DMAC 110, and image data of each line input from the scanner I/F is compressed only in the copy mode, unlike the prior art. Then, the compressed image data is written in the main memory 2000 via the DMAC 110. This contributes to reducing the necessary size of buffer 1 between the scanner I/F 100 and the scanner image processing unit 200, and the memory band between the control chip and the main memory.

The scanner image processing unit 200 reads out the compressed image data of each rectangle from the main memory 2000. The DPCM decompression processing unit 205 newly added in the scanner image processing unit 200 decompresses the image data for each line. Then, the subsequent image processing is executed.

In the scan mode, the same process as in the prior art without compressing the image data output from the scanner I/F to the DMAC 110 and decompressing in the DPCM decompression processing unit 205 is executed, thereby preventing image degradation upon compression.

In this embodiment, a fixed length DPCM compression process that encodes the difference value between the current pixel and the preceding input pixel is employed as the compression process. The DPCM compression process utilizes high correlation between adjacent pixels in image data. If this compression method is used before the shading process that corrects the sensitivity fluctuation between the pixels of the sensor, the image quality largely degrades upon compression.

To solve this problem, in this embodiment, the shading process and γ-conversion process are executed first for the line-sequential data output from the scanner I/F 100. Then, the DPCM compression is executed. The γ-conversion further reduces the gradation change as compared to a case where this conversion is not executed. Hence, image degradation upon DPCM compression can further be suppressed.

In Japanese Patent Publication Laid-Open No. 2004-220584, shading data is read out from the main memory together with image data. In this embodiment, the shading memory 122 comprised of an SRAM is provided in the copy image processing unit to speed up the shading data read operation and decrease the number of times of read operation from the main memory. Data stored in the shading memory in advance is used as shading data necessary for the shading process in the copy mode. This allows the capacity of the main memory to hold shading data in the copy mode to be reduced and obviates the shading data read operation from the main memory.

According to the above-described embodiment, the buffer memory capacity necessary in the copy mode decreases. It is therefore possible to reduce the buffer memory size necessary for the entire system to implement the copy and scan functions.

Additionally, the number of times of data input/output operations between the control chip and the main memory (buffer 1) halves. Selective use of the buffer memory in the copy and scan modes provides the following advantages.

(1) The main memory capacity necessary in the copy mode decreases, and the memory size required of the entire system decreases. This leads to reduction of the total cost of the apparatus.

(2) The number of memory input/output operations related to image data and shading data in the copy mode decreases.

(3) The shading data area in the main memory in the copy mode becomes unnecessary.

(4) Image degradation upon DPCM image compression in the scan mode is prevented.

(5) Since the shading process in the reading processing unit is executed only in the copy mode, the capacity of the shading memory necessary in the copy image processing unit is reduced.

Another embodiment of the present invention will now be described.

In the above-described embodiment, both the copy image processing unit 120 and the scanner image processing unit 200 have shading processing units 121 and 201 and γ-conversion processing units 123 and 202, respectively. However, these two units in the copy image processing unit 120 and the counterparts in the scanner image processing unit 200 are functionally identical and never operate simultaneously. Hence, the MPF may be arranged such that it includes a single shading processing unit, a single γ-conversion processing unit and a selector, and the data flow is switched over by the selector.

Figure 9:
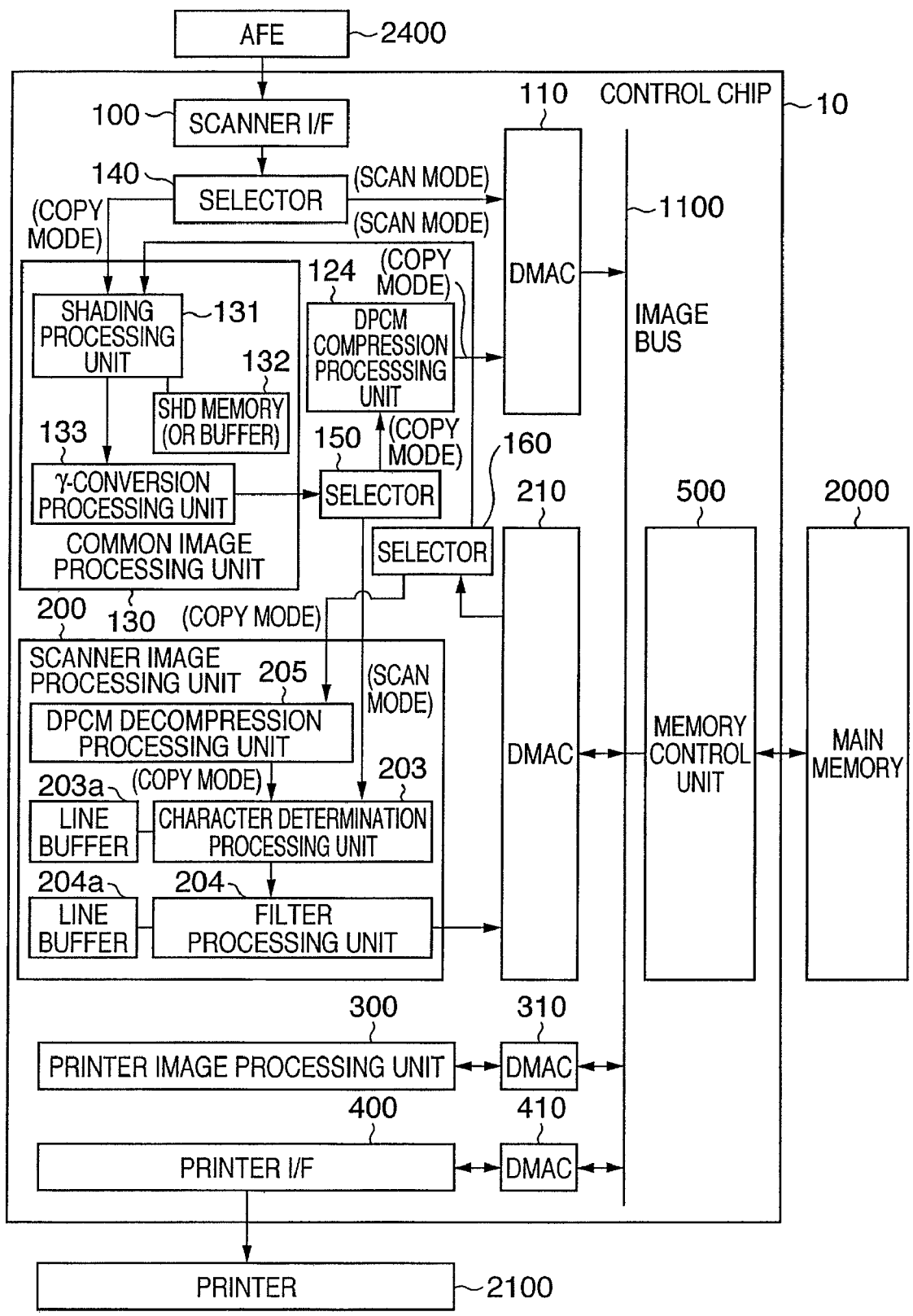
FIG. 9 is a block diagram showing the schematic arrangement of a multifunction printer according to another embodiment of the present invention.

The operation will be described with reference to FIG. 9.

<Operation in Copy Mode>

Image data A/D-converted by an AFE 2400 is sent to a common image processing unit 130 by a selector 140 via a scanner I/F 100. A shading processing unit 131 executes shading correction by referring to shading data in a shading (SHD) memory 132. The shading processing unit 131 executes correction even in the scan mode, as will be described later. After the process by a γ-conversion processing unit 133, a DPCM compression processing unit 124 compresses the image data received via a selector 150. The compressed data is stored in a main memory 2000 via a DMAC 110. The compressed image data read out from the main memory 2000 is sent to a selector 160 via a DMAC 210. The selector 160 switches to send the image data to a scanner image processing unit 200. The image data is decompressed by a DPCM decompression processing unit 205 and undergoes processing by a character determination processing unit 203 and a filter processing unit 204. The image data is input to a printer image processing unit 300 via the DMACs 210 and 310 and converted into data to be sent to the printer.

<Operation in Scan Mode>

The flow of image data up to the selector 140 is the same as in the copy mode. The selector 140 switches to transfer the uncompressed image data to the main memory 2000 via the DMAC 110 and store it under control of a memory control unit 500.

The uncompressed image data read out from the main memory 2000 is sent to the common image processing unit 130 by the selector 160 via the DMAC 210. The image data undergoes shading processing and γ-conversion processing, as in the copy mode, and is directly sent to the character determination processing unit 203 by the selector 150. The image data in the scan mode is uncompressed image data and need not pass through the DPCM decompression processing unit 205. The subsequent data flow is the same as in the copy mode.

According to this embodiment, the common image processing unit 130 executes the processes common to the copy and scan modes. Hence, the process and system can be simplified.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2006-188697 and 2007-168087, respectively filed Jul. 7, 2006 and Jun. 26, 2007, which are hereby incorporated by reference herein in their entirety.

What is claimed is:

1. A multifunction printer having a first function of copying an image original and a second function of transferring image data obtained by scanning the image original to an external device (PC), comprising:
    reading means configured to line-sequentially read the image original to obtain uncompressed image data;
    a memory;
    first image processing means configured to execute a shading process and a compressing process for the image data;
    transfer means configured to transfer the image data from said reading means to said memory means via said first image processing means when the first function of copying an image original is executed, such that shaded and compressed image data is transferred to said memory, and to transfer the image data from said reading means to said memory without shading and compression by said first image processing means when the second function of transferring image data obtained by scanning is executed;
    second image processing means configured to decompress compressed image data read from said memory when the first function is executed, and to execute a shading process for uncompressed image data read from said memory when the second function is executed; and
    filtering means configured to execute a filtering process for the image data processed by said second image processing means.

2. The printer according to claim 1, wherein said first image processing means line-sequentially compresses the image data read by said reading means.

3. The printer according to claim 1, wherein said first image processing means compresses the image data by a DPCM method.

4. The printer according to claim 1, further comprising:
    third image processing means configured to convert the filtered image data by said filtering means into data to be sent;
    print means configured to print an image on a printing medium by using the data.

5. The printer according to claim 1, wherein said second image processing means decompresses the compressed image data by a DPCM method.

6. The printer according to claim 1, wherein said first image processing means and said second image processing means are implemented on a semiconductor chip.

7. The printer according to claim 1, wherein said first image processing means further includes:
    shading processing means configured to execute the shading process for the image data read by said reading means prior to image data compression by compression means; and
    γ-conversion means configured to execute γ-conversion for the image data that has undergone the shading process by said shading processing means.

8. The printer according to claim 1, wherein said second image processing means includes:
    shading processing means configured to execute a shading process for the uncompressed image data read out from said memory; and
    γ-conversion means configured to execute γ-conversion for the image data that has undergone the shading process by said second shading processing means.

9. An image processing method executed by a multifunction printer having a first function of copying an image original and a second function of transferring image data obtained by scanning the image original to an external device (PC), the method comprising the steps of:
    line-sequentially reading the image original to obtain uncompressed image data;
    upon execution of the first function of copying an image original, shading and compressing the read image data using a first image processing means, transferring the shaded and compressed image data to a memory, and decompressing the compressed image data read from the memory; and
    upon execution of the second function of transferring image data obtained by scanning, transferring the read image data to the memory without shading and compressing the read image data by using the first image processing means, and shading the uncompressed and unshaded image data read from the memory.

* * * * *